(12) United States Patent
Weng et al.

(10) Patent No.: US 11,108,246 B2
(45) Date of Patent: Aug. 31, 2021

(54) CHARGING SYSTEM AND CHARGING CIRCUIT THEREOF

(71) Applicant: ZHUHAI JIELI TECHNOLOGY CO., LTD, Guangdong (CN)

(72) Inventors: Jiancheng Weng, Guangdong (CN); Haitao Huang, Guangdong (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 152 days.

(21) Appl. No.: 16/697,233

(22) Filed: Nov. 27, 2019

(65) Prior Publication Data

US 2020/0195031 A1    Jun. 18, 2020

(30) Foreign Application Priority Data

Dec. 14, 2018  (CN) .......................... 201811535197.3

(51) Int. Cl.
*H01M 10/46* (2006.01)
*H02J 7/00* (2006.01)

(52) U.S. Cl.
CPC .............. *H02J 7/00* (2013.01); *H02J 7/0044* (2013.01)

(58) Field of Classification Search
CPC ...... H02J 7/0036; H02J 7/0034; H02J 7/0045; H02J 7/0044; H02J 50/10; H02J 50/12; H02J 50/40
USPC ................ 320/107, 108, 140, 159, 162, 165
See application file for complete search history.

(56) References Cited

U.S. PATENT DOCUMENTS

2012/0195075 A1* 8/2012 Nate ...................... H02M 1/36
                                                363/21.01
2014/0145504 A1* 5/2014 Kayama ................. H02J 50/10
                                                307/23
2018/0309315 A1* 10/2018 Der ................... H02J 7/007192

* cited by examiner

*Primary Examiner* — Edward Tso

(57) ABSTRACT

The present invention provides a charging system and a charging circuit thereof, including a circuit of a charging apparatus and a circuit of a wireless portable electronic device capable of recognizing an electric connection relationship with the charging apparatus.

17 Claims, 2 Drawing Sheets

CHARGING SYSTEM AND CHARGING CIRCUIT THEREOF

CROSS REFERENCE TO RELATED APPLICATIONS

The present application claims the benefit of Chinese Patent Application No. 201811535197.3 filed on Dec. 14, 2018. All the above are hereby incorporated by reference.

FIELD OF THE INVENTION

The present invention relates to the field of charging, and in particular, to a charging system and a charging circuit thereof.

BACKGROUND OF THE INVENTION

In recent years, various portable electronic devices are rapidly growing. True Wireless Stereo (TWS) is one of the most representative portable electronic devices at present. A wireless earphone, which connects to an external device without using a wire or cable, needs an internal lithium battery to supply power. A charging case is a dedicated device for charging the wireless earphone.

The charging case is initially in a standby state. After a wireless earphone is placed into the charging case, the charging case detects insertion of the earphone, and then starts boosting to charge the wireless earphone. When detecting that the earphone is taken out, the charging case enters the standby state again, to reduce power consumption thereof. Currently, detection technologies of many charging cases are mainly active mode and passive mode: 1. Actions of opening and closing a cover of the charging case are detected by using an opening/closing detection circuit of the charging case to control charging for the earphone in the charging case. That is, after it is detected that the cover of the charging case is opened, the charging case is waken up to start boosting, so as to charge the wireless earphone. After it is detected that the cover of the charging case is closed, boosting of the charging case is off, so as to reduce power consumption thereof. 2. A mechanical switch or a spring is added in the charging case, so that different hardware connections when the wireless earphone is placed into and taken out of the charging case are converted into different electrical signals that are transmitted to a chip of the charging case, to wake up or switch off a boosting module. In the active mode, the opening/closing detection circuit constantly consumes battery power of the charging case no matter whether the charging case is in an open state or a closed state. In the passive mode, the mechanical switch or the spring increases the cost on one hand, and on the other hand, inevitably occurs as a result of wear and reliability issues after the wireless earphone is placed in and taken out many times over a long period of time. Especially, in the foregoing two modes, there are certain match requirements for the sizes of the charging case and the wireless earphone.

In addition, as the portable electronic devices are developing to further improve user experience and endurance. The wireless earphone is automatically connected back to a mobile phone after being taken out of the charging case. If the wireless earphone was playing music before being placed into the charging case, the wireless earphone continues to play music through wireless communication (for example, Bluetooth communication), and the user does not need to press an on-off button manually. As long as the wireless earphone is still in the charging case, no matter whether the wireless earphone is being charged or is fully charged, especially if the charging case outputs zero voltage due to under voltage protection of the charging case or due to battery low voltage protection of the charging case, it is required that the wireless earphone should not be connected back to the mobile phone and should enter a low power mode. In other words, even if the charging case has no output, it needs to be identified whether the wireless earphone is in the charging case or not. In the existing technology, a Hall sensor is added in the charging case, and actions of placing the wireless earphone into and taking the wireless earphone out of the charging case are identified through level changes generated due to change of a magnetic field of the Hall sensor. However, adding the Hull sensor means an increase in the cost.

SUMMARY OF THE INVENTION

According to a first aspect, to overcome the defect of the prior art, avoid using the mechanical switch, the spring, and the Hall sensor in a charging apparatus, and enable a wireless portable electronic device to detect an electric connection relationship between the wireless portable electronic device and a charging apparatus, the present invention provides a circuit of a charging system, including a circuit of a charging apparatus and a circuit of a wireless portable electronic device capable of recognizing an electric connection relationship with the charging apparatus. The circuit of the wireless portable electronic device includes a second detection control module, a current source, a second switch, a resistor, and a charging input terminal. The charging input terminal is configured to be in contact with and electrically connected to a charging output terminal of the circuit of the charging apparatus. The current source is grounded through the charging input terminal and the resistor. The circuit of the charging apparatus includes a charging output terminal and a first switch. The charging output terminal is grounded through the first switch. The first switch is controlled to be on when the power source is undervoltage, and controlled to be off when the power source is not undervoltage. The second detection control module is configured to enable, by controlling the second switch when a switch flag is ON, the current source to output a second current that passes through the resistor, and enable, by controlling the second switch when the switch flag is OFF, the current source to stop working. The second detection control module is further configured to determine an electric connection relationship between the wireless portable electronic device and the charging apparatus according to a detected level of the charging input terminal and the switch flag.

According to a second aspect, to overcome the defect of the prior art, avoid using the mechanical switch, the spring, and the Hall sensor in a charging apparatus, and enable a wireless portable electronic device to detect an electric connection relationship between the wireless portable electronic device and a charging apparatus, the present invention further provides a charging system, including the circuit of the charging system according to the first aspect.

According to a third aspect, to overcome the defect of the prior art, avoid using the mechanical switch, the spring, and the Hall sensor in a charging apparatus, and enable a charging apparatus to detect an electric connection relationship between the charging apparatus and a wireless portable electronic device, the present invention provides a circuit of a charging system, including a circuit of a charging apparatus capable of recognizing an electric connection relation with a wireless portable electronic device and a circuit of the wireless portable electronic device. The circuit of the charging apparatus includes: a DC-DC module, a first detection control module, and a charging output terminal. An output terminal of the DC-DC module is connected to the charging output terminal. The first detection control module is configured to set a mode flag to a constant current mode when a current outputted by the DC-DC module is equal to zero, and the DC-DC module is configured to work in the constant current mode according to the mode flag, so as to output a first current. The circuit of the wireless portable electronic device includes: a resistor and a charging input terminal. The charging input terminal is grounded through the resistor. The charging output terminal is configured to be in contact with and electrically connected to the charging input terminal. The first detection control module is configured to determine that an electric connection is formed between the charging apparatus and the wireless portable electronic device when it is detected that a voltage of the charging output terminal jumps from a high level to a low level and the mode flag is the constant current mode, set the mode flag to a voltage mode, and control the DC-DC module to output a first voltage according to the voltage mode.

According to a fourth aspect, to overcome the defect of the prior art, avoid using the mechanical switch, the spring, and the Hall sensor in a charging apparatus, and enable a charging apparatus to detect an electric connection relationship between the charging apparatus and a wireless portable electronic device, the present invention provides a charging system, including the circuit of the charging system according to the third aspect.

The present invention achieves the following beneficial effects:

For a wireless portable electronic device and a system including the same, through the foregoing technical solutions, it is avoided to add a mechanical switch, a spring, a Hall sensor or other elements in a charging apparatus, while the wireless portable electronic device can detect an electric connection relationship between the electric connection relation and the charging apparatus. As a further effect, it is unnecessary to make a special design on casings of the charging apparatus and the wireless portable electronic device to adapt to the mechanical switch, the spring, or the Hall sensor, thus reducing the cost and improving the reliability.

For a charging apparatus and a system including the same, by using the above charging system or the circuit of the charging system, it can be avoided to add a mechanical switch, a spring, a Hall sensor or other elements in the charging apparatus to detect an electric connection relationship between the charging apparatus and a wireless portable electronic device. As a further effect, it is unnecessary to make a special design on casings of the charging apparatus and the wireless portable electronic device to adapt to the mechanical switch, the spring, or the Hall sensor, thus reducing the cost and improving the reliability.

BRIEF DESCRIPTION OF THE DRAWINGS

The present invention is further described in the following with reference to the accompanying drawings and embodiments. In the drawings.

DETAILED DESCRIPTION

Preferred embodiments of the present invention are described in detail now with reference to the accompanying drawings.

Figure 1:
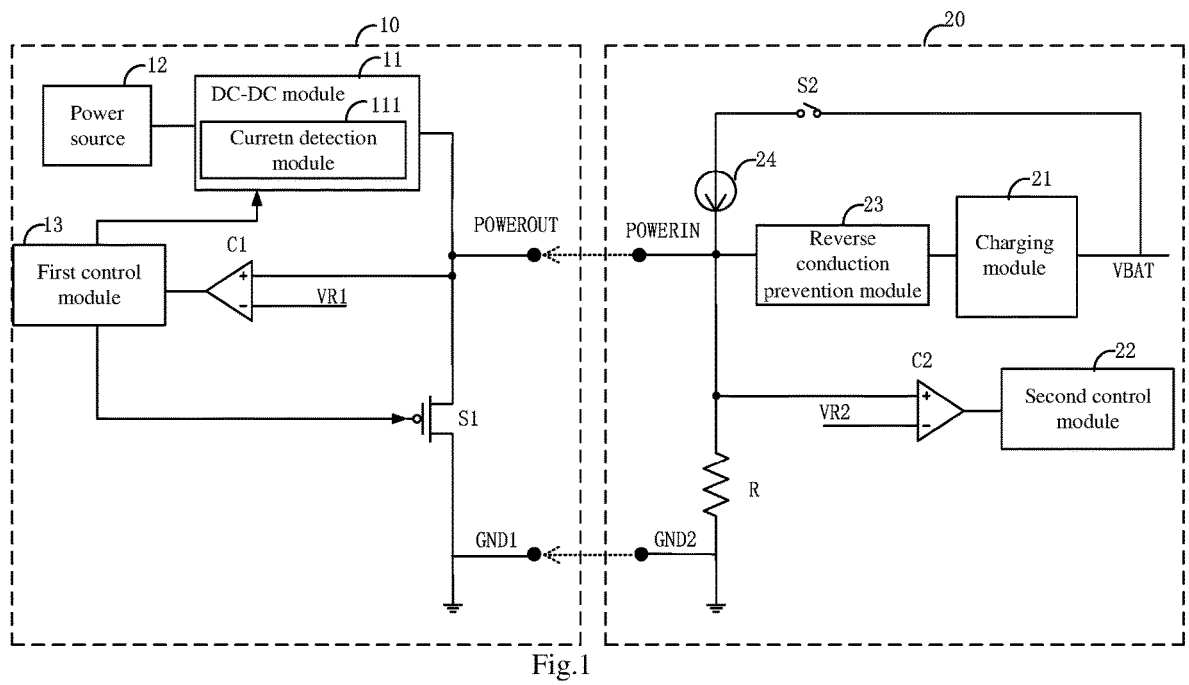
FIG. 1 is a schematic diagram of an embodiment of a charging system including a charging case and a wireless earphone according to the present invention.

FIG. 1 is a schematic diagram of an embodiment of a charging system including a charging case and a wireless earphone according to the present invention. The charging system is capable of recognizing an electric connection relation between the charging case and the wireless earphone. The charging case 10 includes a DC-DC module 11, a first detection control module, a first switch S1, a power source 12, a charging output terminal POWEROUT, and a first ground terminal GND1. The DC-DC module 11 includes a current detection module 111. In an embodiment, the first detection control module includes a first comparison module C1 and a first control module 13. The wireless earphone 20 includes a charging module 21, a second detection control module, a current source 24, a second switch S2, a resistor R, a reverse conduction prevention module 23, a charging input terminal POWERIN, a rechargeable battery VBAT, and a second ground terminal GND2. In an embodiment, the second detection control module includes a second comparison module C2 and a second control module 22.

In the charging case 10, the DC-DC module 11 has an input terminal connected to the power source 12 and an output terminal connected to the charging output terminal POWEROUT. The charging output terminal POWEROUT is grounded through the first switch S1. The first comparison module C1 has an in-phase input terminal connected to the charging output terminal POWEROUT, an inverting input terminal connected to a first reference voltage VR1, and an output terminal connected to an input terminal of the first control module 13. The first ground terminal GND1 is grounded. The current detection unit 111 is configured to detect a current outputted by the DC-DC module 11. It is easy to understand that, the current detection unit 111 may also be disposed outside the DC-DC module 11. The first control module 13 manages a mode flag (the mode flag may be stored in a register) of the DC-DC module 11. The mode flag has two values: a constant current mode and a voltage mode (such as a boosting mode). The first control module 13 may set the value of the mode flag to switch between the constant current mode and the voltage mode. An initial value of the mode flag may be set to the constant current mode. The first control module 13 controls a working mode of the DC-DC module 11 according to the value of the mode flag. When the value of the mode flag is the voltage mode, the first control module 13 controls, according to the mode flag, the DC-DC module 11 to output a first voltage for charging the wireless earphone 20. When the value of the mode flag is the constant current mode, the first control module 13 controls the DC-DC module 11 to output a constant current (a first current) according to the mode flag. In an embodiment, the first voltage is a voltage (charging voltage), such as 5V, obtained by boosting a voltage of the power source 12 by the DC-DC module 11 when the DC-DC module 11 works in a boosting mode. The first control module 13 may be a logic circuit, and the first comparison module C1 may be a comparator.

In the wireless earphone 20, the charging input terminal POWERIN is connected to the rechargeable battery VBAT through the reverse conduction prevention module 23 and the charging module 21. The second comparison module C2 has an in-phase input terminal connected to the charging input terminal POWERIN, an inverting input terminal connected to a second reference voltage VR2, and an output terminal connected to an input terminal of the second control module 22. The second comparison module C2 is configured to compare the voltage of the charging input terminal POWERIN and the second reference voltage VR2. The second control module 22 manages a switch flag (the switch flag may be stored in a register). The values of the switch flag include: ON and OFF. The second control module 22 is configured to control on/off of the second switch S2 according to the value of the switch flag. When the value of the switch flag is ON, the second control module 22 controls the second switch S2 to be on according to the value (ON) of the switch flag. When the value of the switch flag is OFF, the second control module 22 controls the second switch S2 to be off according to the value (OFF) of the switch flag. The rechargeable battery VBAT is connected to the charging input terminal POWERIN through the second switch S2 and the current source 24. The charging input terminal POWERIN is grounded through the resistor R. The second ground terminal GND2 is grounded. The rechargeable battery VBAT supplies power to the current source 24 through the second switch S2. When the second switch S2 is off, the current source 24 stops working, that is, an outputted current is zero. When the second switch S2 is on, the current source 24 outputs a second current that flows through the resistor R. The second control module 22 may be a logic circuit, and the second comparison module C2 may be a comparator. The reverse conduction prevention module 23 is configured to prevent a voltage of the charging module 21 and/or a voltage of the battery VBAT (through the charging module 21) from flowing backward to the charging input terminal POWERIN, so as to avoid an error in a level detected by the second detection control module, thus avoiding an judgement error in an electric connection relation obtained. In an embodiment, the reverse conduction prevention module 23 may be a diode, where an anode of the diode is connected to the charging input terminal POWERIN, and a cathode of the diode is connected to the charging module 21. The reverse conduction prevention module 23 may also be a one-way conduction switch, or the like. It can be appreciated that the reverse conduction prevention module 23 may also be integrated in the charging module 21.

Figure 2:
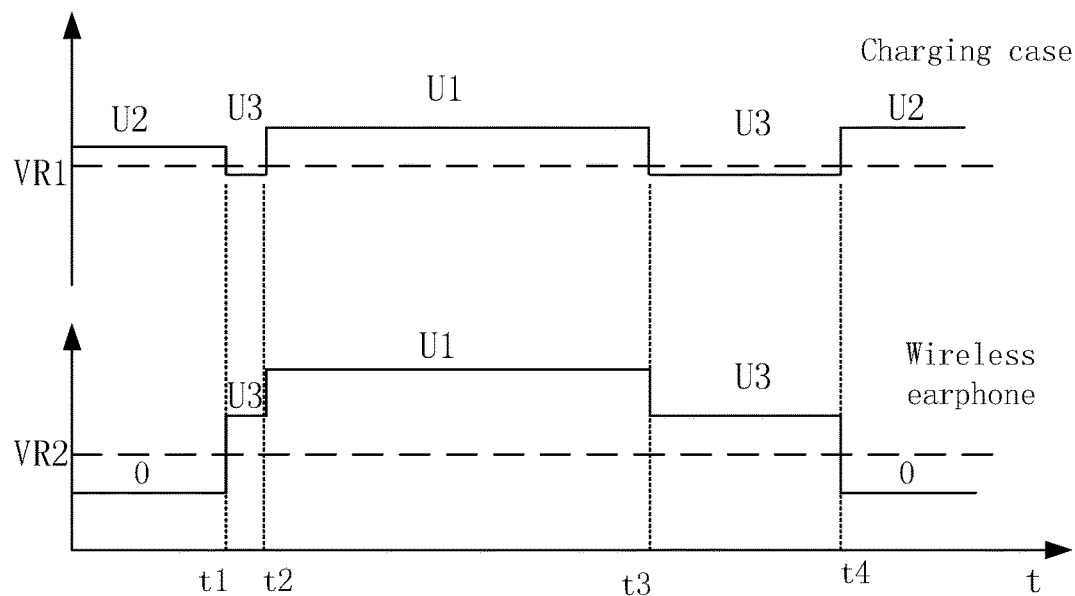
FIG. 2 is a schematic diagram of an embodiment of a comparison between voltage oscillograms of a charging output terminal of the charging case and a charging input terminal of the wireless earphone in FIG. 1.

In an initial stage (for example, after the charging case 10 is powered on), before the earphone 20 to be charged is in contact with the charging case 10 to form an electric connection (for example, the earphone 20 is placed into the charging case 10 to form an electric connection, on the side of the charging case 10, the first control module 13 sets the mode flag of the DC-DC module 11 to the constant current mode. The first control module 13 controls the DC-DC module 11 to work in the constant current mode and controls the first switch S1 to be off according to the mode flag. On the side of the wireless earphone 20, the second switch S2 is off. Specifically, as shown in FIG. 2, in the charging case 10, because the first switch S1 is off in this case, the DC-DC module 11 is idle, a current actually outputted by the DC-DC module 11 is zero, and the voltage of the charging output terminal POWEROUT is pulled up to a second voltage U2 (in an embodiment, the second voltage U2 is the voltage of the power source of the charging case 10). That is, the voltage of the in-phase input terminal of the first comparison module C1 is the second voltage U2, and the voltage of the inverting input terminal of the first comparison module C1 is the first reference voltage VR1. Because the second voltage U2 is greater than the first reference voltage VR1, the first comparison module C1 outputs a high level to the first control module 13. Based on this, when the first control module 13 detects that the first comparison module C1 outputs a high level and the mode flag is the constant current mode, it is determined that the charging case 10 is not electrically connected to the wireless earphone 20 at this time (or, upon detection that the current outputted by the DC-DC module is 0, it is determined that the charging case 10 is not electrically connected to the wireless earphone 20 at this time). Therefore, the value of the mode flag is maintained at the constant current mode, and the first switch S1 remains off. As shown in FIG. 2, in the wireless earphone 20, because the second switch S2 is off, the current outputted by the current source 24 is zero, and the voltage of the charging input terminal POWERIN is zero. That is, the voltage of the in-phase input terminal of the second comparison module C2 is zero, and the voltage of the inverting input terminal of the second comparison module C2 is the second reference voltage VR2. Therefore, the second comparison module C2 outputs a low level to the second control module 22. Based on this, when the second control module 22 detects that the second comparison module C2 outputs a low level and the switch flag is OFF, it is determined that the wireless earphone 20 is not electrically connected to the charging case 10, thus keeping the switch flag unchanged.

When the wireless earphone 20 needs to be electrically connected to the charging case 10 so as to be charged (for example, the wireless earphone 20 is placed into the charging case 10 so as to be charged), electric contact is formed between the charging output terminal POWEROUT and the charging input terminal POWERIN, thus forming an electric connection. Power of the charging case 10 is delivered to the wireless earphone 20 through the charging output terminal POWEROUT and the charging input terminal POWERIN. The first ground terminal GND1 is connected to the second ground terminal GND2. However, it is also possible that the first ground terminal GND1 is not connected to the second ground terminal GND2. As shown in FIG. 2, because the mode flag is the constant current mode, once an electric connection is formed between the charging output terminal POWEROUT and the charging input terminal POWERIN, the DC-DC module 11 outputs a constant first current. The first current flows through the charging output terminal POWEROUT, the charging input terminal POWERIN, and the resistor, to the ground. In this case, the voltages of the charging output terminal POWEROUT and the charging input terminal POWERIN are I1*R2 (as shown in FIG. 2, the voltage of the charging output terminal POWEROUT declines to U3 at time point W. That is, the voltage of the in-phase input terminal of the first comparison module C1 is I1*R2. Because I1*R2 is less than the first reference voltage VR1, the first comparison module C1 outputs a low level to the first control module 13. Based on this, when the first control module 13 detects that the level outputted by the first comparison module C1 jumps from a high level to a low level (that is, determining that the voltage of the charging output terminal POWEROUT jumps from a high level to a low level) and the value of the mode flag is the constant current mode, it is determined that the wireless earphone 20 is already electrically connected to the charging case 10 and the mode flag is changed to the voltage mode. The first control module 13 switches, according to the mode flag (voltage mode), the DC-DC module 11 from the constant current mode to the voltage mode (such as a boosting mode) in which the first voltage is outputted. Afterwards, the voltage of the charging output terminal POWEROUT is maintained at the first voltage (as shown in FIG. 2, the voltage of the charging output terminal POWEROUT is increased to U1 at time point t2). Because the first voltage is greater than the first reference voltage VR1, the first comparison module C1 outputs a high level. Based on this, when the first control module 13 detects that the first comparison module C1 outputs a high level and the value of the mode flag is the voltage mode, it is determined that the charging case 10 is still electrically connected to the wireless earphone 20 and the charging case 10 is charging the wireless earphone 20. For the wireless earphone 20, at the moment when the wireless earphone 20 is inserted into the charging case 10, the voltage of the charging input terminal POWERIN is I1*R2 (that is, the voltage of the in-phase input terminal of the second comparison module C2 is I1*R2; as shown in FIG. 2, the voltage of the charging input terminal POWERIN is pulled up to U3 at time point W. Because I1*R2 is greater than the second reference voltage VR2, the second comparison module C2 outputs a high level to the second control module 22. Based on this, when the second control module 22 detects that the level outputted by the second comparison module C2 jumps from a low level to a high level (that is, the voltage of the charging input terminal POWERIN jumps from a low level to a high level) and the value of the switch flag is OFF, it is determined that an electric connection is formed between the wireless earphone 20 and the charging case 10, and the charging module 21 is controlled to be on. Afterwards, the charging input terminal POWERIN is maintained at the first voltage (as shown in FIG. 2, the voltage is further pulled up to U1 at time point t2). Because the first voltage is greater than the second reference voltage VR2, the second comparison module C2 continues to output a high level. The first voltage outputted by the charging case 10 charges the rechargeable battery VBAT through the charging input terminal POWERIN, the reverse conduction prevention module 23, and the charging module 21. Based on this, when the second control module 22 detects that the second comparison module C2 outputs a high level (that is, the voltage of the charging input terminal POWERIN is at a high level) and the value of the switch flag is OFF, it is determined that an electric connection is formed between the wireless earphone 20 and the charging case 10, and the charging module 21 is continuously controlled to be ON.

As the rechargeable battery VBAT of the wireless earphone 20 gets closer to full charge, the charging current flowing into the charging module 21 is decreased gradually. Therefore, the charging current outputted by the DC-DC module 11 is decreased gradually. On one hand, after the current detection unit 111 of the charging case 10 detects that the charging current is less than a preset current threshold (in an embodiment, the current threshold is slightly greater than a current value obtained by dividing the first voltage by the resistor), a corresponding signal is outputted to the first control module 13. The first control module 13 changes the value of the mode flag from voltage mode to constant current mode according to the signal. The first control module 13 controls, according to the mode flag (the constant current mode), the DC-DC module 11 to work in the constant current mode, that is, the first current is outputted. The charging case 10 no longer supplies power to the charging module 21. This state of the charging case 10 may be referred to as a standby state. On the other hand, the wireless earphone 20 may also perform the following operation: when the current detection unit 111 of the wireless earphone 20 detects that the charging current flowing into the charging module 21 is less than a threshold, the second control module 22 controls the charging module 21 to be off. When the DC-DC module 11 outputs the first current, the voltages of the charging output terminal POWEROUT and the charging input terminal POWERIN are I1*R2. For the charging case 10, the voltage I1*R2 of the in-phase input terminal of the first comparison module C1 (as shown in FIG. 2, at time point t3, the voltage declines to U3) is less than the voltage of the inverting input terminal (that is, the first reference voltage VR1). Therefore, the first comparison module C1 outputs a low level. Based on this, when the first control module 13 detects that the level outputted by the first comparison module C1 jumps from a high level to a low level (that is, the level of the charging output terminal POWEROUT jumps from a high level to a low level) and the value of the mode flag is the constant current mode, the first control module 13 determines that the wireless earphone 20 is electrically connected to the charging case 10. For the wireless earphone 20, the voltage I1*R2 of the in-phase input terminal of the second comparison module C2 (as shown in FIG. 2, the voltage declines to U3 at time point t3) is greater than the voltage of the inverting input terminal (that is, the second reference voltage VR2). Therefore, the second comparison module C2 outputs a high level. Based on this, when the second control module 22 detects that the second comparison module C2 outputs a high level and the value of the switch flag is OFF, the second control module 22 determines that the wireless earphone 20 is still electrically connected to the charging case 10.

When the electric connection between the wireless earphone 20 and the charging case 10 is disrupted (for example, the user takes the wireless earphone 20 out of the charging case 10), there are the following cases: 1. the electric connection between the charging case 10 and the wireless earphone 20 is disrupted when the charging case 10 is charging the wireless earphone 20 (in this case, the value of the mode flag is the voltage mode); 2. the electric connection between the charging case 10 and the wireless earphone 20 is disrupted when the wireless earphone 20 is fully charged (in this case, the value of the mode flag is the constant current mode). In the first case, for the charging case 10, because the voltage of the in-phase input terminal of the first comparison module C1 (the first voltage) is greater than the voltage of the inverting input terminal (the first reference voltage VR1), the first comparison module C1 outputs a high level. In addition, the current detected by the current detection unit 111 of the charging case 10 is 0. Based on this, when the first control module 13 detects that the first comparison module C1 outputs a high level and the current detected by the current detection unit 111 is 0, the first control module 13 determines that the electric connection between the charging case 10 and the wireless earphone 20 is disrupted, and the mode flag is changed from the voltage mode to the constant current mode. The first control module 13 controls the DC-DC module 11 to switch from the voltage mode to the constant current mode according to the mode flag (constant current mode). In the second case, for the charging case 10, because the voltage of the in-phase input terminal of the first comparison module C1 (the second voltage U2; as shown in FIG. 2 the voltage is pulled up to U2 at time point t4) is greater than the voltage of the inverting input terminal (the first reference voltage VR1), the first comparison module C1 outputs a high level. Based on this, when the first control module 13 detects that the first comparison module C1 outputs a high level and the value of the mode flag is the constant current mode, the first control module 13 determines that the electric connection between the charging case 10 and the wireless earphone 20 is disrupted (or upon detection that the current outputted by the DC-DC module is 0, it is determined that the charging case 10 is not electrically connected to the wireless earphone 20). For the wireless earphone 20, in both the first case and the second case, before the wireless earphone 20 is taken out, the voltage of the in-phase input terminal of the second comparison module C2 (which is the first voltage in the first case and is I1*R2 in the second case) is greater than the voltage of the inverting input terminal (the second reference voltage VR2). Therefore, the second comparison module C2 outputs a high level. After the wireless earphone 20 is taken out, the voltage of the in-phase input terminal of the second comparison module C2 (which is 0; as shown in FIG. 2, the voltage declines to 0 at time point t4) is less than the voltage of the inverting input terminal (the second reference voltage VR2). Therefore, the second comparison module C2 outputs a low level. That is, in this process, the level outputted by the second comparison module C2 jumps from a high level to a low level. Based on this, when the second control module 22 detects that the level outputted by the second comparison module C2 jumps from a high level to a low level and the switch flag is OFF, the second control module 22 determines that the electric connection between the wireless earphone 20 and the charging case 10 is disrupted (for example, the wireless earphone 20 is taken out of the charging case 10).

In an embodiment, to protect the charging case 10, output of the DC-DC module 11 needs to be off when the voltage of the power source 12 of the charging case 10 is less than a threshold (which may include the following cases: 1. When the voltage of the power source 12 is less than a first voltage threshold, only output of the DC-DC module 11 is off, while the power source 12 still supplies power to the first control module 13; therefore, in this case, the first control module 13 can still control on-off of the first switch S1 through a high level or a low level. 2. When the voltage of the power source 12 is less than a second voltage threshold (which is less than the first voltage), output of the DC-DC module 11 is off, and at the same time, the power source 12 stops supplying power to other circuits). Moreover, the first switch S1 is controlled to be on. To enable the wireless earphone 20 to detect the electric connection between the wireless earphone 20 and the charging case 10 more accurately, when the second control module 22 detects that the level outputted by the second comparison module C2 jumps from a high level to a low level, the second control module 22 changes the value of the switch flag to be ON, then controls the second switch S2 to be closed according to the value of the switch flag (which is ON in this case), and next detects the level outputted by the second comparison module C2. The second control module 22 further determines an electric connection relation between the wireless earphone 20 and the charging case 10 according to the level outputted by the second comparison module C2 and the switch flag.

Figure 3:
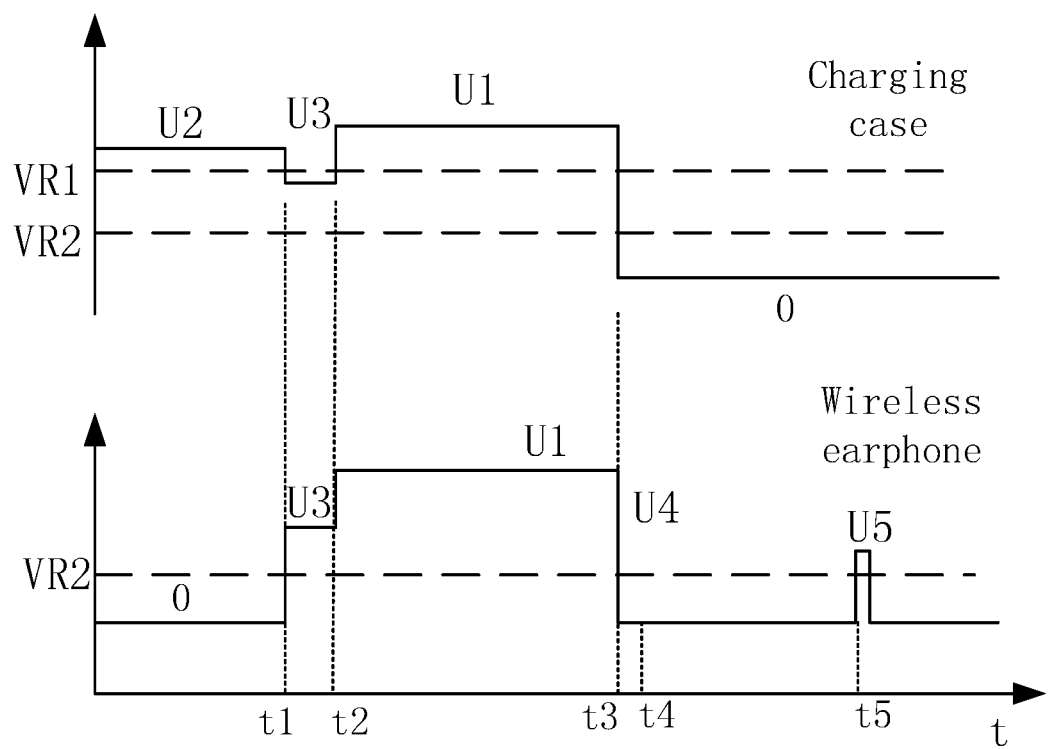
FIG. 3 is a schematic diagram of another embodiment of a comparison between voltage oscillograms of a charging output terminal of the charging case and a charging input terminal of the wireless earphone in FIG. 1.

When the charging case 10 is provided with undervoltage protection, there are the following cases: 1. the electric connection between the charging case 10 and the wireless earphone 20 is disrupted when the charging case 10 is charging the wireless earphone 20 (in this case, the value of the mode flag is the voltage mode); 2. the electric connection between the charging case 10 and the wireless earphone 20 is disrupted when the wireless earphone 20 is fully charged (in this case, the value of the mode flag is the constant current mode); 3. undervoltage occurs before the electric connection between the charging case 10 and the wireless earphone 20 is disrupted (the wireless earphone 20 is fully charged or is not fully charged). For the wireless earphone 20, in both the first case and the second case, before the wireless earphone 20 is taken out, the voltage of the in-phase input terminal of the second comparison module C2 (which is the first voltage in the first case and is I1*R2 in the second case) is greater than the voltage of the inverting input terminal (the second reference voltage VR2). Therefore, the second comparison module C2 outputs a high level. After the wireless earphone 20 is taken out, the voltage of the in-phase input terminal of the second comparison module C2 (which is 0) is less than the voltage of the inverting input terminal (the second reference voltage VR2). Therefore, the second comparison module C2 outputs a low level. That is, in this process, the level outputted by the second comparison module C2 jumps from a high level to a low level. Next, if the second switch S2 is on, the voltage of the in-phase input terminal (I2*R2) of the second comparison module C2 is greater than the voltage of the inverting input terminal (the second reference voltage VR2). Therefore, the second comparison module C2 outputs a high level. Based on this, when the second control module 22 detects that the level outputted by the second comparison module C2 jumps from a high level to a low level and the switch flag is OFF, the second control module 22 changes the value of the switch flag to be ON, and then controls the second switch S2 to be on according to the value of the switch flag (which is ON in this case). The second control module 22 then detects the level outputted by the second comparison module C2. Next, the second control module 22 detects the output level. If the output level is a high level, the second control module 22 determines that an electric connection between the wireless earphone 20 and the charging case 10 is disrupted (for example, the wireless earphone 20 is taken out from the charging case 10). In the third case, before the charging case 10 is undervoltage, the voltage of the in-phase input terminal (the first voltage or I1*R2) of the second comparison module C2 is greater than the voltage of the inverting input terminal (the second reference voltage VR2). When the charging case 10 is undervoltage, the first control module 13 controls the DC-DC module 11 to stop voltage output and controls the first switch S1 to be on. In this case, the voltage of the in-phase input terminal (that is, the voltage of the charging output terminal POWEROUT, which is 0) of the second comparison module C2 is less than the voltage of the inverting input terminal (the second reference voltage VR2). Therefore, the second comparison module C2 outputs a low level. As shown in FIG. 3, the voltages of the charging output terminal POWEROUT and the charging input terminal POWERIN decline from U1 to 0 at time point t3. If the second switch S2 is on at time point t4 next to t3, the voltage of the in-phase input terminal (which is 0; as shown in FIG. 3, the voltage is still 0 at time point t4) of the second comparison module C2 is still less than the voltage of the inverting input terminal (the second reference voltage VR2) at this time. Therefore, the second comparison module C2 outputs a low level. Based on this, when the second control module 22 detects that the level outputted by the second comparison module C2 jumps from the high level to the low level and the switch flag is OFF, the second control module 22 changes the value of the switch flag to be ON, and then controls the second switch S2 to be on according to the value of the switch flag (which is ON at this time). The second control module 22 then detects the output level of the second comparison module C2 again. Then, the second control module 22 detects the output level. If the output level is a low level, the second control module 22 determines that the wireless earphone 20 is electrically connected to the charging case 10 and the charging case 10 is in an undervoltage state. If the output level is a high level, the second control module 22 determines that the electric connection between the wireless earphone 20 and the charging case 10 is disrupted.

To determine the electric connection relation between the wireless earphone 20 and the charging case 10 more accurately while reducing the power consumption of the wireless earphone 20, besides controlling the second switch S2 to be on when the output level of the second comparison module C2 jumps from a high level to a low level, it is also feasible to change the switch flag at a particular frequency, so as to control the second switch S2 to be on at a particular frequency (for example, switched on every 1 ms or 2 ms). Then, the second control module 22 detects the output level of the second comparison module C2, and determines the electric connection relation between the wireless earphone 20 and the charging case 10 according to the output level and the switch flag at this point. For example, in the third case described above, when the second control module 22 detects that the level outputted by the second comparison module C2 jumps from a high level to a low level and the switch flag is OFF, the second control module 22 changes the value of the switch flag to be ON, and then controls the second switch S2 to be on according to the value of the switch flag (which is ON at this time). The second control module 22 then detects the output level of the second comparison module C2. Then, the second control module 22 detects the output level. If the output level is a low level, the second control module 22 determines that the wireless earphone 20 is electrically connected to the charging case 10, and the charging case 10 is in an undervoltage state. If the wireless earphone 20 is taken out of the charging case 10 by the user after a period of time, the voltage of the in-phase input terminal (which is 0) of the second comparison module C2 is less than the voltage of the inverting input terminal (the second reference voltage VR2) when the wireless earphone 20 is taken out of the charging case 10. Therefore, the second comparison module C2 outputs a low level. When the second switch S2 is closed, the voltage of the in-phase input terminal (which is I2*R2; as shown in FIG. 3, the voltage of the charging input terminal POWERIN is pulled up to U5 at time point t5) of the second comparison module C2 is greater than the voltage of the inverting input terminal (the second reference voltage VR2). Therefore, the second comparison module C2 outputs a high level. Accordingly, the second control module 22 changes the switch flag to ON at a particular frequency, then controls the second switch S2 to be on according to the switch flag, and further detects the level outputted by the second comparison module C2. If the second comparison module C2 outputs a low level before the second switch S2 is on and the second comparison module C2 outputs a high level when the second switch S2 is on, it is determined that the electric connection between the wireless earphone 20 and the charging case 10 is disrupted. Then, the switch flag is changed to OFF again, and the second switch S2 is controlled to be off according to the switch flag. If the second comparison module C2 outputs a low level before the second switch S2 is on and the second comparison module C2 still outputs a low level when the second switch S2 is on, it is determined that the wireless earphone 20 is still eclectically connected to the charging case 10 and the charging case 10 is undervoltage. Then, the switch flag is changed to OFF, and the second switch S2 is controlled to be off according to the switch flag.

In an embodiment, to help the wireless earphone 20 to detect the electric connection relationship between the wireless earphone 20 and the charging case 10 when the charging case 10 is undervoltage and further improve undervoltage protection of the charging case 10, an enhanced p-channel MOS switch transistor is used as the first switch S1. The first control module 13 outputs a gate control signal to the gate of the enhanced p-channel MOS switch transistor, so as to control on-off of the enhanced p-channel MOS switch transistor. When the charging case 10 is undervoltage, all circuits including the DC-DC module 11, the first control module 13, and the like may be switched off. Therefore, the gate control signal of the enhanced p-channel MOS switch transistor is a low level (0), and the enhanced p-channel MOS switch transistor is on. It can be learned that, switching on the enhanced p-channel MOS switch transistor does not need to consume power of the charging case 10, and also provides a basis for the wireless earphone 20 to implement detection. In an embodiment, its source is connected to the charging output terminal POWEROUT, and its drain is grounded. Due to the conduction characteristic of the enhanced p-channel MOS switch transistor, I2*R2 needs to be greater than a threshold voltage Vth (a minimum voltage difference between the source and the gate required for making the source and the drain conductive) of the enhanced p-channel MOS switch transistor. In this way, the enhanced p-channel MOS switch transistor is on only when the charging case 10 enters undervoltage protection and the second switch S2 is on. In this way, when the voltage of the power source 12 is less than the first voltage threshold, the first control module 13 may proactively apply a low level to the gate of the enhanced p-channel MOS switch transistor to switch on the enhanced p-channel MOS switch transistor. When the voltage of the power source 12 is less than the second voltage threshold, the level outputted by the first control module 13 to the gate of the enhanced p-channel MOS switch transistor is forcibly pulled down to the low level, so that the enhanced p-channel MOS switch transistor is on.

In an embodiment, the first reference voltage VR1 is relatively small. To ensure that the first comparison module C1 outputs a low level the moment when the wireless earphone 20 is electrically connected to the charging case 10, the voltage of the charging output terminal POWEROUT may pass through a voltage division circuit, then inputs to the in-phase input terminal of the first comparison module C1. Assuming that a voltage division coefficient is k (which is less than 1), the following relation is true: VR1>k*I1*R2. In some cases, the voltage division coefficient may be equal to 1. However, the voltage of the charging input terminal POWERIN may also be inputted to the in-phase input terminal of the second comparison module C2 without passing through a voltage division circuit.

It can be appreciated that, signal terminals connected to the two input terminals of the first comparison module C1 may be interchanged: the in-phase input terminal of the first comparison module C1 is connected to the first reference voltage VR1, and the inverting input terminal thereof is connected to the charging output terminal POWEROUT. In this case, control logic of the first control module 13 is opposite to that of the foregoing embodiment (for example, when the first comparison module C1 outputs a high level, the first control module 13 determines that the charging case 10 is electrically connected to the wireless earphone 20, thus controlling the DC-DC module 11 to work in the voltage mode). Definitely, it is also possible to add an inverter between the output terminal of the first comparison module C1 and the first control module 13. In this case, the control logic of the first control module 13 is the same as that of the foregoing embodiment. Likewise, signal terminals connected to the two input terminals of the second comparison module C2 may also be interchanged, and details are not described herein again.

For implement control over the current source 24, the second switch S2 may be a part of the current source 24. The second control module 22 implements control over the current source 24 by controlling on-off of the second switch S2.

In the foregoing embodiments, the electric connection relationship between the wireless earphone 20 and the charging case 10 can be determined, and the wireless earphone 20 can further control more operations of the wireless earphone 20 based on the determined electric connection relation. For example, when the wireless earphone 20 is electrically connected to the charging case 10, the wireless earphone 20 is disconnected from the mobile phone and stops playing music, etc. When it is determined that the electric connection between the wireless earphone 20 and the charging case 10 is disrupted, the wireless earphone 20 is connected to the mobile phone again, and starts to play music again. Similarly, when the wireless earphone 20 is electrically connected to or electrically disconnected from the charging case 10, the charging case 10 may send out a corresponding prompt.

Although the foregoing embodiments are described in detail by using the charging case 10 and the wireless earphone 20 as an example, it can be appreciated that the charging case 10 may also be a charging apparatus in any other form, and the wireless earphone 20 may be a wireless portable electronic device in another form (such as a smart band or a smart watch) which is charged through contact rather than a wire, especially a wireless portable electronic device smaller than and similar to the wireless earphone 20.

It should be understood that the embodiments above are merely used to describe the technical solutions of the present invention, and are not intended to limit the present invention. For a person skilled in the art, modifications may be made to the technical solutions recorded in the foregoing embodiments, or equivalent replacements may be made on some of the technical features therein. These modifications or replacements shall fall within the protection scope of the claims of the present invention.

What is claimed is:

1. A circuit of a charging system, comprising a circuit of a charging apparatus and a circuit of a wireless portable electronic device capable of recognizing an electric connection relation with the charging apparatus, wherein
the circuit of the wireless portable electronic device comprises a second detection control module, a current source, a second switch, a resistor, and a charging input terminal; the charging input terminal is configured to be in contact with and electrically connected to a charging output terminal of the charging apparatus; and the current source is grounded through the charging input terminal and the resistor;
the circuit of the charging apparatus comprises the charging output terminal, a first switch and a power source; the charging output terminal is grounded through the first switch; the first switch is controlled to be on when the power source is undervoltage, and controlled to be off when the power source is not undervoltage;
the second detection control module is configured to enable, by controlling the second switch when a switch flag is ON, the current source to output a second current that passes through the resistor, and enable, by controlling the second switch when the switch flag is OFF, the current source to stop working; and
the second detection control module is further configured to determine an electric connection relation between the wireless portable electronic device and the charging apparatus according to a detected level of the charging input terminal and the switch flag.

2. The circuit according to claim 1, wherein the circuit of the charging apparatus comprises further comprises a first detection control module; the first switch is an enhanced p-channel MOS switch transistor, and when the power source is undervoltage, the first detection control module outputs a zero voltage to a gate of the enhanced p-channel MOS switch transistor.

3. The circuit according to claim 1, wherein
the second detection control module being further configured to determine an electric connection relation between the wireless portable electronic device and the charging apparatus according to a detected level of the charging input terminal and the switch flag is specifically as follows:
the second detection control module is further configured to determine that an electric connection is formed between the wireless portable electronic device and the charging apparatus, when it is detected that a voltage of the charging input terminal is at a high level and the switch flag is OFF; or
the second detection control module is further configured to set the switch flag to ON when it is detected that a voltage of the charging input terminal jumps from a high level to a low level, and control the second switch to be on according to the switch flag; if the charging input terminal is at a high level, the second detection control module determines that the electric connection between the wireless portable electronic device and the charging apparatus is disrupted, and if the charging input terminal is at a low level, the second detection control module determines that the wireless portable electronic device and the charging apparatus are electrically connected; or
after the second detection control module detects that the level of the charging input terminal jumps from a high level to a low level, the second detection control module performs the following operations at a preset frequency: changing the switch flag to ON so as to control the second switch to be on; and the second detection control module detecting the level of the charging input terminal again, determining that the electric connection between the wireless portable electronic device and the charging apparatus is disrupted if the level of the charging input terminal is a high level, and determining that the wireless portable electronic device and the charging apparatus are electrically connected if the level of the charging input terminal is a low level.

4. The circuit according to claim 1, wherein
the second detection control module comprises a second control module and a second comparison module;
the second comparison module has a first input terminal connected to the charging input terminal, a second input terminal connected to a second reference voltage, and an output terminal connected to the second control module;

the second control module is configured to enable, by controlling the second switch when the switch flag is ON, the current source to output the second current, and enable, by controlling the second switch when the switch flag is OFF, the current source to stop working, and detect the level of the charging input terminal according to a level outputted by the second comparison module;

wherein a product of the second current and the resistance of the resistor is greater than the second reference voltage.

5. The circuit according to claim 1, wherein
the circuit of the wireless portable electronic device further comprises a reverse conduction prevention module and a charging module, and the reverse conduction prevention module is configured to prevent a voltage of the charging module from flowing backward to the charging input terminal.

6. A charging system, comprising a circuit of a charging apparatus and a circuit of a wireless portable electronic device capable of recognizing an electric connection relation with the charging apparatus, wherein
the circuit of the wireless portable electronic device comprises a second detection control module, a current source, a second switch, a resistor, and a charging input terminal; the charging input terminal is configured to be in contact with and electrically connected to a charging output terminal of the charging apparatus; and the current source is grounded through the charging input terminal and the resistor;
the circuit of the charging apparatus comprises the charging output terminal, a first switch and a power source; the charging output terminal is grounded through the first switch; the first switch is controlled to be on when the power source is undervoltage, and controlled to be off when the power source is not undervoltage;
the second detection control module is configured to enable, by controlling the second switch when a switch flag is ON, the current source to output a second current that passes through the resistor, and enable, by controlling the second switch when the switch flag is OFF, the current source to stop working; and
the second detection control module is further configured to determine an electric connection relation between the wireless portable electronic device and the charging apparatus according to a detected level of the charging input terminal and the switch flag.

7. A circuit of a charging system, comprising a circuit of a charging apparatus capable of recognizing an electric connection relation with a wireless portable electronic device and a circuit of the wireless portable electronic device, wherein
the circuit of the charging apparatus comprises: a power source, a DC-DC module, a first detection control module, and a charging output terminal; an output terminal of the DC-DC module is connected to the charging output terminal; the first detection control module is configured to set a mode flag to a constant current mode when a current outputted by the DC-DC module is equal to zero, and the DC-DC module is configured to work in the constant current mode according to the mode flag, so as to output a first current;
the circuit of the wireless portable electronic device comprises: a resistor and a charging input terminal; the charging input terminal is grounded through the resistor; the charging output terminal is configured to be in contact with and electrically connected to the charging input terminal; and
the first detection control module is configured to determine that an electric connection is formed between the charging apparatus and the wireless portable electronic device when it is detected that a voltage of the charging output terminal jumps from a high level to a low level and the mode flag is the constant current mode, set the mode flag to a voltage mode, and control the DC-DC module to output a first voltage according to the voltage mode.

8. The circuit according to claim 7, wherein
the first detection control module comprises a first control module and a first comparison module; the first comparison module has a first input terminal connected to the charging output terminal, a second input terminal connected to a first reference voltage, and an output terminal connected to the first control module;
a product of the first current, the resistance of the resistor, and a voltage division coefficient is less than the first reference voltage; and
the first control module is configured to detect a level of the charging input terminal according to a level outputted by the first comparison module.

9. The circuit according to claim 8, wherein
the circuit of the wireless portable electronic device further comprises a second detection control module;
the second detection control module comprises a second control module and a second comparison module; the second comparison module has a first input terminal connected to the charging input terminal, a second input terminal connected to a second reference voltage, and an output terminal connected to the second control module;
a product of the first current and the resistance of the resistor is greater than the second reference voltage, and a product of the second current and the resistance of the resistor is greater than the second reference voltage; and
the second control module is configured to detect the level of the charging input terminal according to a level outputted by the second comparison module, so as to determine an electric connection relation between the wireless portable electronic device and the charging apparatus.

10. The circuit according to claim 8, wherein
the circuit of the charging apparatus further comprises a first switch; the charging output terminal is grounded through the first switch; the first switch is controlled to be on when the power source is undervoltage, and is controlled to be off when the power source is not undervoltage;
the circuit of the wireless portable electronic device further comprises: a second detection control module, a current source, and a second switch; the current source is grounded through the charging input terminal and the resistor; the second detection control module is configured to enable, by controlling the second switch when a switch flag is ON, the current source to output a second current, and enable, by controlling the second switch when the switch flag is OFF, the current source to stop working; and
the second detection control module is further configured to determine an electric connection relation between the wireless portable electronic device and the charging apparatus according to a detected level of the charging input terminal and the switch flag.

11. The circuit according to claim 10, wherein
the first detection control module comprises a first control module and a first comparison module; the first comparison module has a first input terminal connected to the charging output terminal, a second input terminal connected to a first reference voltage, and an output terminal connected to the first control module;
a product of the first current, the resistance of the resistor, and the voltage division coefficient is less than the first reference voltage; and
the first control module is configured to detect the level of the charging input terminal according to a level outputted by the first comparison module.

12. The circuit according to claim 11, wherein
the second detection control module comprises a second control module and a second comparison module; the second comparison module has a first input terminal connected to the charging input terminal, a second input terminal connected to a second reference voltage, and an output terminal connected to the second control module;
a product of the first current and the resistance of the resistor is greater than the second reference voltage, and a product of the second current and the resistance of the resistor is greater than the second reference voltage;
the second detection control module being further configured to determine an electric connection relation between the wireless portable electronic device and the charging apparatus according to a detected level of the charging input terminal and the switch flag is specifically as follows:
the second control module is configured to detect the level of the charging input terminal according to a level outputted by the second comparison module, so as to determine the electric connection relation between the wireless portable electronic device and the charging apparatus according to the level of the charging input terminal and the switch flag.

13. The circuit according to claim 7, wherein
the circuit of the wireless portable electronic device further comprises a reverse conduction prevention module, and the reverse conduction prevention module is configured to prevent a voltage of the charging module from flowing backward to the charging input terminal.

14. The circuit according to claim 10, wherein
the second detection control module being further configured to determine an electric connection relation between the wireless portable electronic device and the charging apparatus according to a detected level of the charging input terminal and the switch flag is specifically as follows:
the second detection control module is configured to determine that an electric connection is formed between the wireless portable electronic device and the charging apparatus, when it is detected that a voltage of the charging input terminal is at a high level and the switch flag is OFF; or
the second detection control module is configured to set the switch flag to ON when it is detected that a voltage of the charging input terminal jumps from a high level to a low level, and control the second switch to be on according to the switch flag; if the charging input terminal is at a high level, the second detection control module determines that the electric connection between the wireless portable electronic device and the charging apparatus is disrupted, and if the charging input terminal is at a low level, the second detection control module determines that the wireless portable electronic device and the charging apparatus are electrically connected; or
after the second detection control module detects that the level of the charging input terminal jumps from a high level to a low level, the second detection control module performs the following operations at a preset frequency:
changing the switch flag to ON so as to control the second switch to be on; and
the second detection control module detecting the level of the charging input terminal again, determining that the electric connection between the wireless portable electronic device and the charging apparatus is disrupted if the level of the charging input terminal is a high level, and determining that the wireless portable electronic device and the charging apparatus are electrically connected if the level of the charging input terminal is a low level.

15. The circuit according to claim 10, wherein
the first switch is an enhanced p-channel MOS switch transistor, and when the power source is undervoltage, the first detection control module outputs a zero voltage to a gate of the enhanced p-channel MOS switch transistor.

16. The circuit according to claim 7, wherein
when a current outputted by the DC-DC module is equal to zero, the first detection control module determines that the electric connection between the charging apparatus and the wireless portable electronic device is disrupted.

17. A charging system, comprising a circuit of a charging apparatus capable of recognizing an electric connection relation with a wireless portable electronic device and a circuit of the wireless portable electronic device, wherein
the circuit of the charging apparatus comprises: a power source, a DC-DC module, a first detection control module, and a charging output terminal; an output terminal of the DC-DC module is connected to the charging output terminal; the first detection control module is configured to set a mode flag to a constant current mode when a current outputted by the DC-DC module is equal to zero, and the DC-DC module is configured to work in the constant current mode according to the mode flag, so as to output a first current;
the circuit of the wireless portable electronic device comprises: a resistor and a charging input terminal; the charging input terminal is grounded through the resistor; the charging output terminal is configured to be in contact with and electrically connected to the charging input terminal; and
the first detection control module is configured to determine that an electric connection is formed between the charging apparatus and the wireless portable electronic device when it is detected that a voltage of the charging output terminal jumps from a high level to a low level and the mode flag is the constant current mode, set the mode flag to a voltage mode, and control the DC-DC module to output a first voltage according to the voltage mode.

* * * * *